United States Patent
Strohmeyer

(10) Patent No.: US 8,678,643 B2
(45) Date of Patent: Mar. 25, 2014

(54) METHOD FOR NON-DESTRUCTIVE TESTING OF AT LEAST PARTIALLY OPEN HOLLOW COMPONENTS OR SYSTEM COMPONENTS FOR TIGHTNESS IN SERIES PRODUCTION

(75) Inventor: Robert Strohmeyer, Berlin (DE)

(73) Assignee: Inpro Innovationsgesellschaft fur Fortgeschrittene Produktionssysteme in der Fahrzeugindustrie mbH, Berlin (DE)

( * ) Notice: Subject to any disclaimer, the term of this patent is extended or adjusted under 35 U.S.C. 154(b) by 328 days.

(21) Appl. No.: 13/149,394

(22) Filed: May 31, 2011

(65) Prior Publication Data
US 2011/0310923 A1 Dec. 22, 2011

(30) Foreign Application Priority Data
Jun. 17, 2010 (DE) .......................... 10 2010 024 134

(51) Int. Cl.
*G01N 25/16* (2006.01)
*G01J 5/00* (2006.01)
*G01N 3/10* (2006.01)
*G01M 3/00* (2006.01)
*B23K 31/02* (2006.01)

(52) U.S. Cl.
USPC ...... 374/4; 374/7; 374/57; 374/153; 374/121; 73/52; 228/103; 250/338.1

(58) Field of Classification Search
USPC .............. 374/4, 5, 120, 121, 124, 55, 7, 187, 374/100, 57, 45, 141, 143, 153, 137, 166, 374/167, 29, 50, 101; 250/338.1; 252/964, 252/960; 702/34, 35, 40; 73/760, 807, 52; 228/103; 327/557
See application file for complete search history.

(56) References Cited

U.S. PATENT DOCUMENTS

| | | | | |
|---|---|---|---|---|
| 4,378,701 A | * | 4/1983 | Mountain et al. | ................ 73/808 |
| 4,841,149 A | * | 6/1989 | Martin et al. | .................. 250/330 |
| 5,163,315 A | * | 11/1992 | Asai et al. | ...................... 73/40.7 |
| 5,861,547 A | * | 1/1999 | Kawai et al. | .................... 73/49.2 |
| 6,394,646 B1 | * | 5/2002 | Ringermacher et al. | .......... 374/7 |
| 6,896,171 B2 | * | 5/2005 | Den Boer et al. | ............. 228/103 |
| 7,083,327 B1 | * | 8/2006 | Shepard | .......................... 374/46 |
| 8,055,054 B2 | * | 11/2011 | Ringermacher et al. | ....... 382/141 |
| 2001/0016278 A1 | * | 8/2001 | Onishi et al. | ..................... 429/49 |
| 2006/0288794 A1 | * | 12/2006 | Hardwicke et al. | ............. 73/763 |
| 2010/0290502 A1 | * | 11/2010 | Cubizolles | ..................... 374/141 |
| 2011/0170572 A1 | * | 7/2011 | Jons et al. | .......................... 374/4 |
| 2012/0032810 A1 | * | 2/2012 | Chillar et al. | .................. 340/600 |

FOREIGN PATENT DOCUMENTS

| | | | |
|---|---|---|---|
| DE | 225 210 A1 | | 7/1984 |
| DE | 3725063 A1 | | 2/1989 |
| DE | 10 2009 031 605 A1 | | 1/2011 |
| JP | 63071645 A | * | 4/1988 |

* cited by examiner

*Primary Examiner* — Gail Verbitsky
(74) *Attorney, Agent, or Firm* — Notaro, Michalos & Zaccaria P.C.

(57) ABSTRACT

A method for non-destructive testing of open hollow components for tightness supplies a gas under pressure into the component and cools the component in a punctiform manner. Detecting a leak out of the component using a thermographic camera and using a computer connected downstream of the thermographic camera to visualise the leak, follows. The precise location of each leak is thus detected.

7 Claims, 2 Drawing Sheets

METHOD FOR NON-DESTRUCTIVE TESTING OF AT LEAST PARTIALLY OPEN HOLLOW COMPONENTS OR SYSTEM COMPONENTS FOR TIGHTNESS IN SERIES PRODUCTION

FIELD AND BACKGROUND OF THE INVENTION

The invention relates to a method for the non-destructive testing of at least partially open hollow components or system components for tightness in series production.

In the case of non-destructive component testing, testing for tightness constitutes an important area. Conventionally, the following methods are used during tightness testing on components and systems in series production such as e.g. on gas meters, fuel tanks, fuel filters, brake lines, light alloy wheels, injection pumps, etc.:

- A water bath bubble test, in which gas or air is introduced into the test specimen under overpressure and escaping of air or gas bubbles due to leaks of the test specimen in the water bath is observed.
- Leak detection by means of differential pressure testing, in which a measurement of the pressure drop after a certain time takes place.
- Ultrasound leak detection, in which gas bubbles escaping from the test specimen in the water bath are detected by means of ultrasound testing devices.
- Tightness testing with test gases which are introduced into the test specimen and are detected during escape through its leaks by means of a detection device.

These conventional methods for the non-destructive testing of hollow components or system components for tightness lack the possibility of automation as is required in the case of series production in the automotive sector in particular. Particularly in the case of the high piece numbers in automobile production, the tests to be carried out visually by a tester quickly reach their limits, are not objective in any case and are additionally cost intensive. In addition, the leak test media, such as water or test gases must additionally be kept ready and their use can make the production process more difficult.

SUMMARY OF THE INVENTION

The invention is therefore based on the object of providing a method of the type mentioned at the beginning, which, in the case of a 100% in-line check, ensures an automatable non-destructive testing of at least partially open hollow components or at least partially open hollow system components for tightness.

This object is achieved according to the invention, in that

- a gas is introduced under pressure and in a manner controlled by valves into an at least partially open hollow component $i=1, 2, \ldots, n$ or an at least partially open hollow system component $j=1, 2, \ldots, m$,
- the punctiform cooling of the at least partially open hollow component $i=1, 2, \ldots, n$ or the at least partially hollow system component $j=1, 2, \ldots, m$, generated during the flowing of the pressurised gas through a leak location out of the at least partially open hollow component $i=1, 2, \ldots, n$ or the at least partially open hollow system component $j=1, 2, m$ by means of expansion in the region of the leak location, is detected by means of a thermographic camera,
- subsequently, the temperature changes of the at least partially open hollow component $i=1, 2, \ldots, n$ or the at least partially open hollow system component $j=1, 2, \ldots, m$ brought about by the punctiform cooling are detected using a computer connected downstream of the thermographic camera and visualised by the computer by means of a multiplicity of images $a=1, 2, \ldots, k$ of a thermographic film, and
- a precise location of each leak location is detected in terms of position and size in the at least partially open hollow component $i=1, 2, \ldots, n$ or in the at least partially open hollow system component $j=1, 2, \ldots, m$ automatically from the multiplicity of the images $a=1, 2, \ldots, k$ of the thermographic film, which contain the temperature distribution in the at least partially open hollow component $i=1, 2, \ldots, n$ or in the at least partially open hollow system component $j=1, 2, \ldots, m$, by illustrating the change of the temperature for every pixel over the testing time in a graph which is used for OK or not OK classification of the at least partially open hollow component $i=1, 2, \ldots, n$ or the at least partially open hollow system component $j=1, 2, \ldots, m$.

Preferably, the at least partially open hollow system component $j=1, 2, \ldots, m$ is chosen consisting of two at least partially open hollow components which are connected by at least one weld seam, wherein the punctiform cooling of the two components welded to one another, generated during the flowing of the gas, which was introduced into the hollow system component $j=1, 2, \ldots, m$ under pressure through a leak of the at least one weld seam forming a leak location, by means of expansion in the region of the leak location, is detected by means of the thermographic camera, subsequently, the temperature changes in the region of the weld seam brought about by the punctiform cooling are detected using the computer connected downstream the thermographic camera and visualised by the computer by means of a multiplicity of images $a=1, 2, \ldots, k$ of a thermographic film, and precise location of the leak is detected in terms of position and size in the weld seam automatically from the multiplicity of the images $a=1, 2, \ldots, k$ of the thermographic film, which contain the temperature distribution in the region of the weld seam of the hollow components of the at least partially open hollow system component $j=1, 2, \ldots, m$, by illustrating the change of temperature from the images $a=1, 2, \ldots, k$ of the thermographic film for every pixel over the testing time in a graph, which is used for OK or not OK classification of the weld seam of the at least partially open hollow system component $j=1, 2, \ldots, m$.

The evaluation of the multiplicity of images $a=1, 2, \ldots, k$ of the thermographic film can take place by means of differential image methods, fast Fourier transformation (FFT) or principal component analysis (HKA).

The cavity of the at least partially open component $i=1, 2, \ldots, n$ or the at least partially open hollow system component $j=1, 2, \ldots, m$ is suitably sealed in the case of the non-destructive tightness test by means of a sealing apparatus. The quantity of the gas, such as e.g. compressed air, fed via the pressurised medium supply into the cavity of the at least partially open hollow component $i=1, 2, \ldots, n$ or the at least partially open hollow system component $j=1, 2, \ldots, m$ is measured constantly by means of a flow meter. Likewise, the overpressure Pi in the cavity of the at least partially open hollow component or the at least partially open hollow system component during the non-destructive tightness testing is checked continuously by means of a pressure gauge. The respective measured values are supplied to the computer during the non-destructive tightness test.

Preferably, the time for non-destructive testing of at least each partially open hollow component $i=1, 2, \ldots, n$ or at least each partially open hollow system component j=1, 2, ..., m for tightness in series production in the case of 100% in-line check is less than 1 second.

The method according to the invention enables a precise location of faults in terms of position and size, whereby faults can be avoided during the optimisation of the production process. In addition, weld seams and/or joining connections of joined at least partially open hollow components and of at least partially open hollow system components can be effectively non-destructively checked in series production for possible leaks. Furthermore, the method according to the invention has great potential for automation and enables the integration of tightness testing of components and system components into the production process, so that it is possible to react to process deviations quickly.

In many areas of production, a 100% test or at least a high degree of sample testing is striven for. With the method according to the invention, the testing time for non-destructive testing of each at least partially open hollow component or each partially open hollow system component for tightness in series production in the case of a 100% in-line check is advantageously less than 1 second. The method according to the invention is therefore very well suited for low cycle times of series production.

BRIEF DESCRIPTION OF THE DRAWINGS

The invention is further explained on the basis of the drawings. In the drawings.

DETAILED DESCRIPTION

Figure 1:
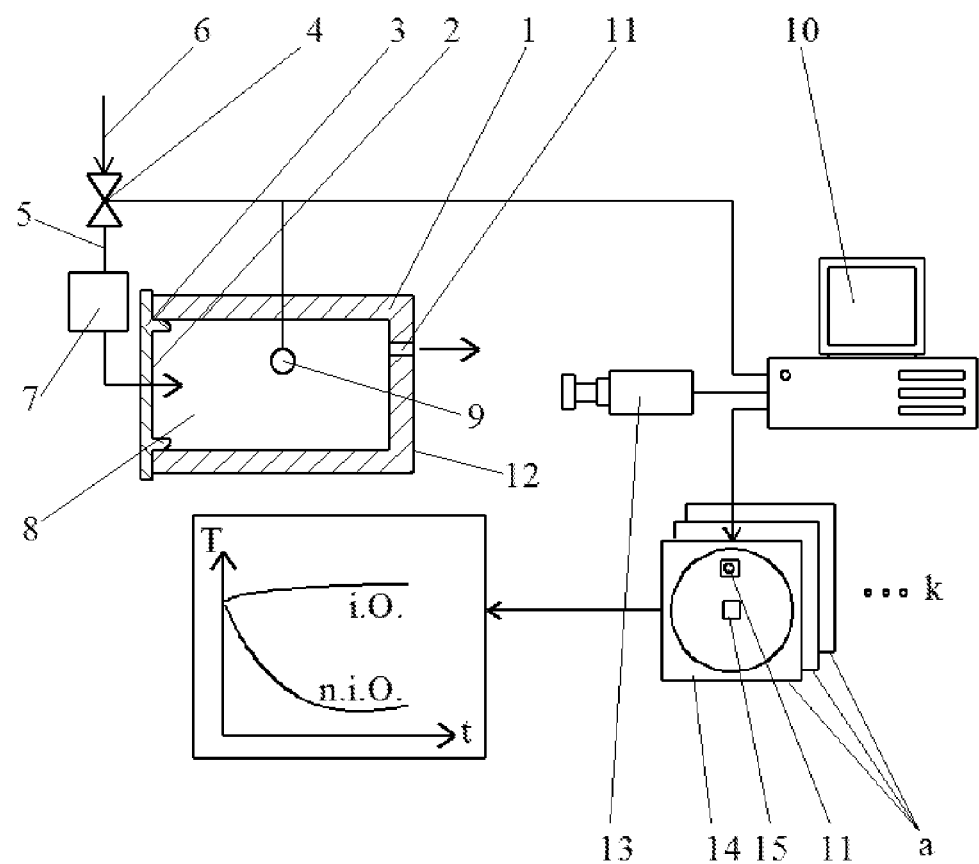
FIG. 1 shows a schematic block diagram, from which an embodiment of the method according to the invention emerges.

As emerges from FIG. 1, for the non-destructive testing of a partially open hollow component 1, the cavity opening 2 of which has been sealed by means of a sealing apparatus 3, e.g. compressed air 6 is introduced in a controlled manner with a pressure Pi via a pressurised medium supply 5 having a valve 4. Here, the quantity of the supplied compressed air 6 is measured constantly by means of a flow meter 7 provided in the pressurised medium supply 5 and the overpressure Pi in the cavity 8 of the hollow component 1 is measured constantly by means of a pressure gauge 9. The valve 4, the flow meter 7 and the pressure gauge 9 are in each case coupled to a computer 10 at the inlet side. The compressed air 6 flows outwardly with a pressure Pu through a leak location 11 in a wall part 12 of the hollow component 1 forming the testing area. Here, the wall part 12 of the hollow component 1 in the region of the leak location 11 is cooled in a punctiform manner by means of the expansion of the escaping air. The punctiform cooling in the region of the leak location 11 is detected by means of a thermographic camera 13 connected to the computer 10. The temperature changes of the sealed partially open hollow component 1 brought about by the punctiform cooling are detected by the computer 10 connected downstream of the thermographic camera 13 and visualised by means of a multiplicity of images a=1, 2, ..., k of a thermographic film 14, from which images a precise location of the leak location 11 is to be detected automatically in terms of position and size in the wall part 12 of the sealed partially open hollow component 1 and also the OK region 15 of the wall part 12. From the images a=1, 2, ..., k of the thermographic film 14, as is shown in FIG. 1, the change of the temperature for every pixel over the testing time is illustrated in a graph which is used for OK or not OK classification of the hollow component 1.

Figure 2:
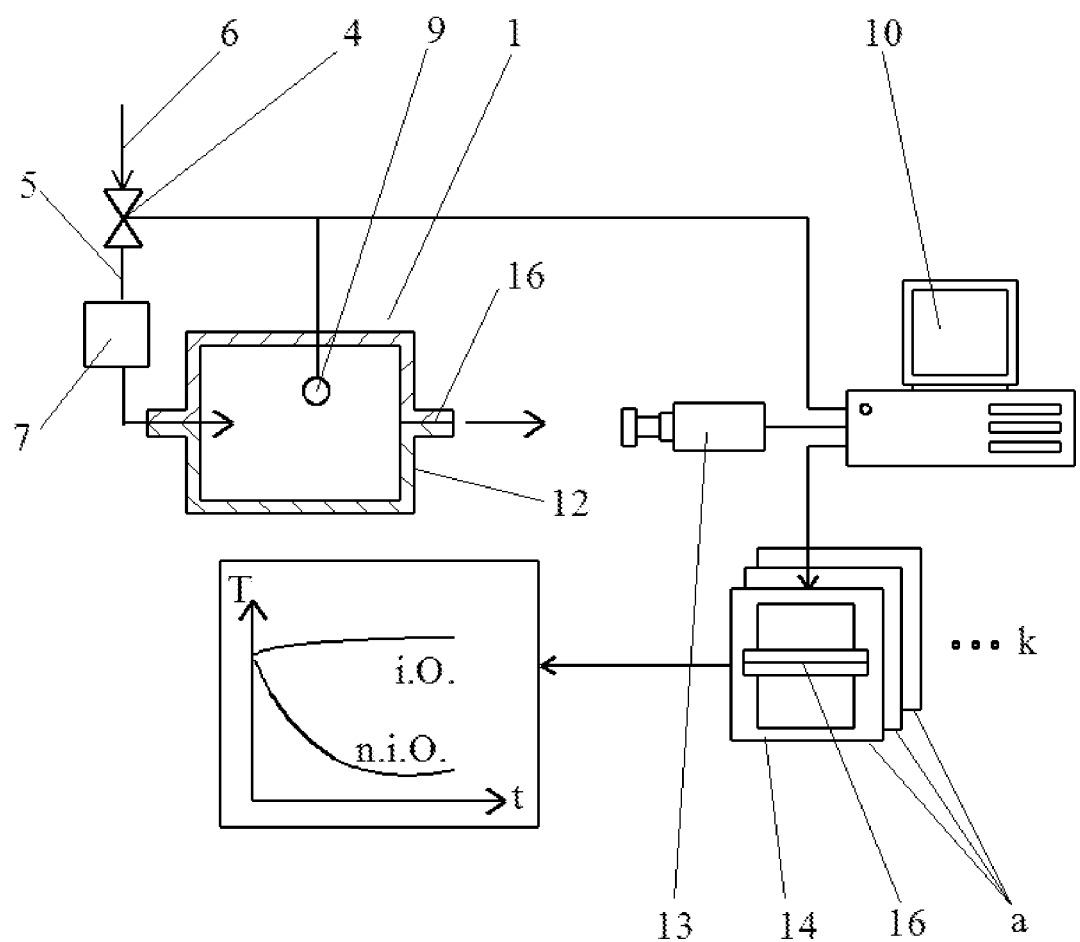
FIG. 2 shows a schematic block diagram with an illustration of a section of a hollow system component made up of two joined partially open hollow components, the joining connection or at least a weld seam of which is tested non-destructively for tightness.

The non-destructive testing for tightness of a weld seam 16 of an at least partially open hollow system component 1, which is formed from two welded partially open hollow components, emerges from FIG. 2 in accordance with the methodology of FIG. 1. Here also, the compressed air 6 is introduced in a controlled manner with a pressure Pi into the cavity 8 of the system component 1 via the pressurised medium supply 5 having a valve 4, the supplied quantity of the compressed air constantly being measured by the flow meter 7 positioned in the pressurised medium supply 5 and the overpressure Pi in the cavity 8 of the at least partially open hollow system component 1 being constantly measured by means of the pressure gauge 9 and the respective measured values being supplied to the computer 10. If compressed air 6 flows with a pressure Pu outwardly through a leak 11 of the weld seam 16 which is integrated in the testing area of the at least partially open hollow system component 1, then the at least partially open hollow system component 1 is cooled in a punctiform manner in the region of the leak 11 of the weld seam 16 by means of the expansion of the escaping air. The punctiform cooling in the region of the leak 11 of the weld seam 16 of the at least partially open hollow system component 1 is detected by means of the thermographic camera 13 connected to the computer 10. The temperature changes in the region of the weld seam 16 of the at least partially open hollow system component 1 brought about by the punctiform cooling are detected by the computer 10 connected downstream of the thermographic camera 13 and visualised by a multiplicity of images a=1, 2, ..., k of the corresponding thermographic film 14. The evaluation of the multiplicity of the images a=1, 2, ..., k of the thermographic film 14 takes place by means of differential image methods, fast Fourier transformation (FFT) or principal component analysis (HKA), a precise location of the leak 11 of the weld seam 16 in terms of position and size taking place and the OK region 15 of the weld seam 16 automatically being detected. As FIG. 2 shows, from the images a=1, 2, ..., k of the thermograhic film 14, the change of temperature over the testing time is also illustrated here for each pixel in a graph which is used for the OK or not OK classification of the welding seam 16 of the at least partially open hollow system component 1.

REFERENCE LIST

1 At least partially open hollow component or at least partially open hollow system component
2 Cavity opening
3 Sealing apparatus
4 Valve
5 Pressurised medium supply
6 Compressed air
7 Flow meter
8 Cavity
9 Compressed air meter
10 Computer
11 Leak location
12 Wall part forming the testing area
13 Thermographic camera
14 Thermographic film
15 OK region
16 Weld seam
a Images of the thermographic film

The invention claimed is:

1. A method for the non-destructive testing of at least partially open hollow components or hollow system components for tightness in series production, wherein:
   a gas is introduced under pressure and in a manner controlled by valves into an at least partially open hollow component i or an at least partially open hollow system component j;
   the punctiform cooling of the at least partially open hollow component i or the at least partially hollow system component j generated during the flowing of the pressurised gas through a leak location out of the at least partially open hollow component i or the at least partially open hollow system component j by means of expansion in the region of the leak location, is detected by means of a thermographic camera;
   subsequently, the temperature changes of the at least partially open hollow component i or the at least partially open hollow system component j brought about by the punctiform cooling are detected using a computer connected downstream of the thermographic camera and visualised by the computer by means of a multiplicity of images a of a thermographic film; and
   a precise location of each leak location is detected in terms of position and size in the at least partially open hollow component i or in the at least partially open hollow system component j automatically from the multiplicity of the images a of the thermographic film, which contain the temperature distribution in the at least partially open hollow component i or in the at least partially open hollow system component j by illustrating the change of the temperature for every pixel over a testing time in a graph which is used for OK-tightness or not OK-tightness classification of the at least partially open hollow component i or the at least partially open hollow system component j.

2. The method according to claim 1, characterised in that the at least partially open hollow system component j is chosen consisting of two at least partially open hollow components which are connected by at least one weld seam, wherein the punctiform cooling of the two components welded to one another, generated during the flowing of the gas, which was introduced into the hollow system component j under pressure through a leak of the at least one weld seam forming a leak location, by means of expansion in the region of the leak location, is detected by means of the thermographic camera, subsequently, the temperature changes in the region of the weld seam brought about by the punctiform cooling are detected using the computer connected downstream the thermographic camera and visualised by the computer by means of a multiplicity of images a of a thermographic film, and precise location of the leak is detected in terms of position and size in the weld seam automatically from the multiplicity of the images a of the thermographic film, which contain the temperature distribution in the region of the weld seam of the hollow components of the at least partially open hollow system component j by illustrating the change of temperature from the images a of the thermographic film for every pixel over the testing time in a graph, which is used for OK-tightness or not OK-tightness classification of the weld seam of the at least partially open hollow system component j.

3. The method according to claim 1, wherein the evaluation of the multiplicity of images a of the thermographic film takes place by means of differential image methods, fast Fourier transformation (FFT) or principal component analysis (HKA).

4. The method according to claim 1, wherein the time for non-destructive testing of each at least partially open hollow component i or each at least partially open hollow system component j for tightness in series production in the case of a 100% in-line check is less than 1 second.

5. The method according to claim 2, wherein the evaluation of the multiplicity of images a of the thermographic film takes place by means of differential image methods, fast Fourier transformation (FFT) or principal component analysis (HKA).

6. The method according to claim 2, wherein the time for non-destructive testing of each at least partially open hollow component i or each at least partially open hollow system component j for tightness in series production in the case of a 100% in-line check is less than 1 second.

7. The method according to claim 3, wherein the time for non-destructive testing of each at least partially open hollow component i or each at least partially open hollow system component j for tightness in series production in the case of a 100% in-line check is less than 1 second.

* * * * *